J. O. WILLIAR.
MACHINE FOR SKINNING MEAT.
APPLICATION FILED FEB. 3, 1909.
935,181.
Patented Sept. 28, 1909.
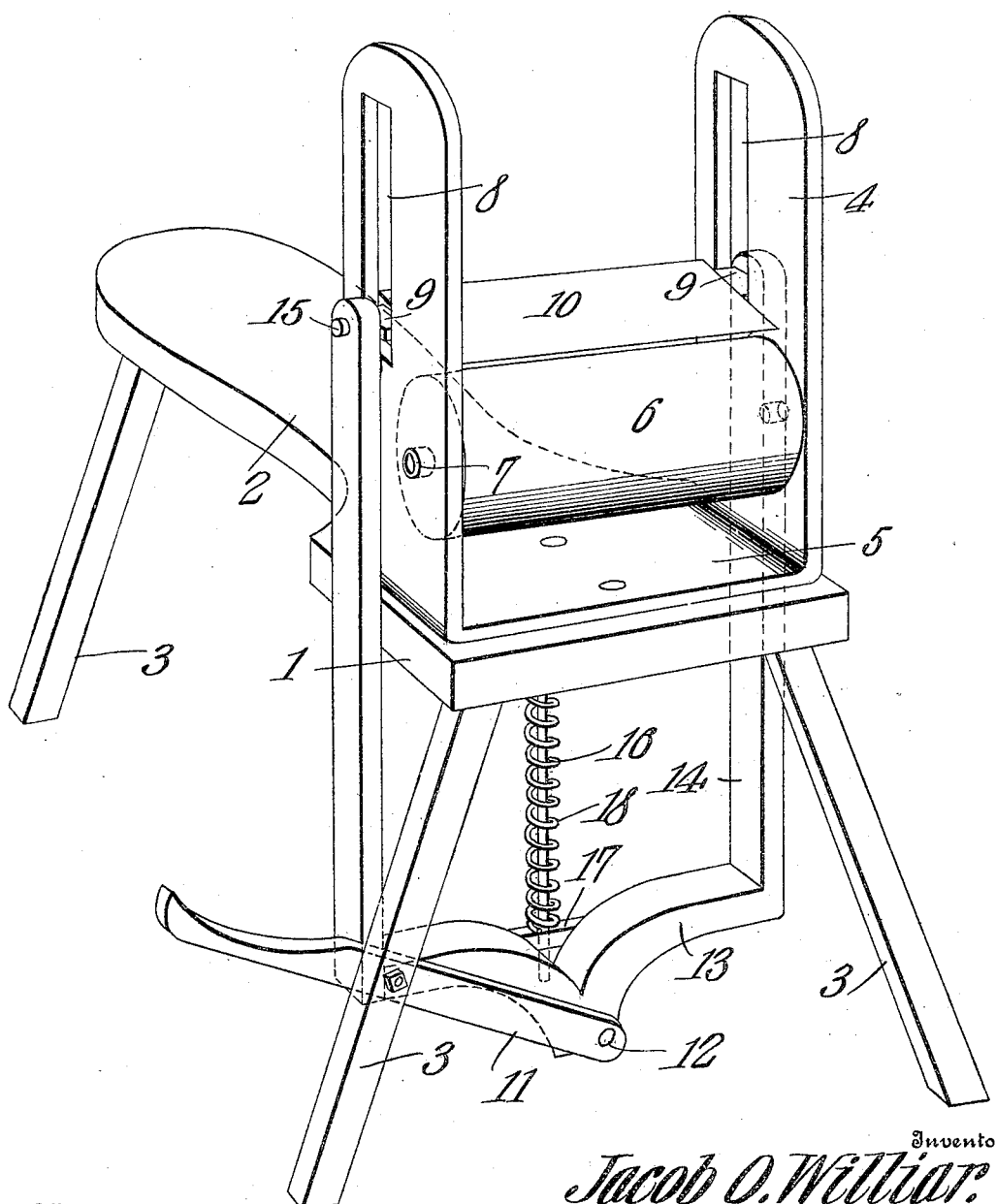
Witnesses
Inventor
Jacob O. Williar.
By C. A. Snow & Co.
Attorneys

UNITED STATES PATENT OFFICE.

JACOB O. WILLIAR, OF MOUNT AIRY, MARYLAND.

MACHINE FOR SKINNING MEAT.

935,181. Specification of Letters Patent. Patented Sept. 28, 1909.

Application filed February 3, 1909. Serial No. 475,824.

*To all whom it may concern:*

Be it known that I, JACOB O. WILLIAR, a citizen of the United States, residing at Mount Airy, in the county of Carroll and State of Maryland, have invented a new and useful Machine for Skinning Meat, of which the following is a specification.

This invention relates to machines for skinning meat and is especially designed for use in preparing meat which is to be reduced to lard.

The object of the invention is to provide a simple and inexpensive device of this character which can be easily operated and the parts of which can be readily taken apart for the purpose of repairing or replacing any of them.

With these and other objects in view the invention consists of certain novel details of construction and combinations of parts hereinafter more fully described and pointed out in the claim.

In the accompanying drawing, which is a perspective view of the machine, the preferred form of the invention has been shown.

Referring to the drawing by characters of reference 1 designates the base of the apparatus, said base being provided with a rounded extension 2 constituting a seat, the base and the seat being preferably formed in one piece and being mounted in any preferred manner as upon legs 3.

Standards 4 are arranged upon the end portions of a base-plate 5, said plate being secured in any suitable manner upon the base 1 so as to position the standards 4 at the sides of the said base. A roller 6 is interposed between the standards and has trunnions or necks 7 journaled within said standards.

Slots 8 extend longitudinally within the standards and slidably mounted within each of them is a block 9. These blocks are formed at the ends of a blade 10, the cutting edge of which is located in vertical alinement with the longitudinal axis of the roller 6.

A foot lever 11 is fulcrumed upon one of the front legs of the machine and one end of this lever is pivotally connected as at 12 to the cross-head 13, from the ends of which extend parallel draw-bars 14. These draw-bars extend to opposite sides of the base 1 and standards 4 and are pivotally connected as at 15 to the blocks 9.

A guide rod 16 extends downwardly from the base 1 and extends loosely through an opening formed within a guide strip 17 secured to the cross-head 13. A coiled spring 18 extends around the guide rod and bears at its ends against the base 1 and against the strip 17 respectively. Obviously this serves to hold the cross-head normally in its lowermost position.

In using the machine herein described the operator straddles and sits upon the seat 2 with the standards 4 in front of him. He then presses downwardly on the projecting end of the lever 11 so as to elevate the cross-head 13 against the stress of the spring 18, this movement resulting in a corresponding elevation of the knife 10. The meat to be skinned is then placed with one end upon the roller 6, after which the lever 11 is released and the spring 18 throws the cross-head 13 downwardly and brings the edge of the knife 10 into contact with the meat. The operator then pulls the meat toward him and between the roller 6 and the knife 10 and said knife will obviously remove from the meat the skin upon the upper portion thereof. The other end of the lever 11 is then again pressed downwardly and the knife 10 elevated so as to permit the insertion of meat thereunder. It will thus be seen that the skinning operation can be carried on quickly and efficiently. Should any parts of the machine become broken they can be readily replaced, but obviously this will rarely occur, owing to the simple character of the construction.

Various changes can of course be made in the construction and arrangement of the parts without departing from the spirit or sacrificing the advantages of the invention.

What is claimed is:—

A machine of the class described comprising a combined seat and a base, standards thereon, a roller journaled between the standards and having fixed bearings, said standards being slotted longitudinally, a knife-blade above the roller and between the standards, means upon said blade and slidably mounted within the slots for preventing the blade from swinging, a spring for holding the blade with its cutting edge normally adjacent the roller, and foot-operated means for shifting the blade against the action of the spring.

In testimony that I claim the foregoing as my own, I have hereto affixed my signature in the presence of two witnesses.

JACOB O. WILLIAR.

Witnesses:
HARRY R. ZEPP,
J. W. BURDETTE.